(12) United States Patent
McCaskill (10) Patent No.: US 6,585,228 B1
(45) Date of Patent: Jul. 1, 2003

(54) ELECTRIC VALVE ACTUATOR WITH EDDY CURRENT CLUTCH

(75) Inventor: Lane P. McCaskill, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 10/056,600

(22) Filed: Jan. 25, 2002

(51) Int. Cl.$^7$ ................................................ F16K 31/02
(52) U.S. Cl. ............................ 251/129.13; 251/129.11
(58) Field of Search ....................... 251/129.01–129.22

(56) References Cited

U.S. PATENT DOCUMENTS

| | | | | |
|---|---|---|---|---|
| 4,920,811 A | * | 5/1990 | Hopper | 251/129.11 |
| 5,195,721 A | * | 3/1993 | Akkerman | 251/129.13 |
| 5,261,446 A | | 11/1993 | Baker | 137/458 |
| 5,295,907 A | * | 3/1994 | Akkerman | 251/129.11 |
| 5,915,668 A | * | 6/1999 | Hodapp et al. | 251/129.13 |
| 6,102,016 A | * | 8/2000 | Sitar et al. | 251/129.13 |
| 6,152,167 A | | 11/2000 | Baker | 137/458 |
| 6,257,549 B1 | * | 7/2001 | Hopper | 251/129.11 |
| 6,488,260 B1 | * | 12/2002 | Dietz | 251/129.13 |

OTHER PUBLICATIONS

U.S. patent application Ser. No. 09/915,796, Newport et al., filed Jul. 26, 2001.
"Planetary Roller Screws, Series RGT", INA Bearing Company, 1989, pp. 4, 5 and 21.

* cited by examiner

Primary Examiner—Paul J. Hirsch
(74) Attorney, Agent, or Firm—Michael P. Hartmann; Peter A. Bielinski (57) ABSTRACT

An electrically operated valve actuator with an eddy current clutch is disclosed. The use of the eddy current clutch provides an actuator that can control the rate of closing of the valve in a predetermined linear manner to avoid slamming the valve shut in an emergency shutdown.

32 Claims, 10 Drawing Sheets

ELECTRIC VALVE ACTUATOR WITH EDDY CURRENT CLUTCH

BACKGROUND OF THE INVENTION

1. Field of the Invention

This invention relates to a valve actuator that is electrically operated and used to selectively move a valve closure member in a gate valve between open and closed positions and thereby control flow through the valve. The actuator is used in emergency situations to quickly close the valve by tripping a release means that allows a coiled spring acting in combination with the residual pressure in the valve acting on the stem to rapidly move the valve closure member from a first, typically open, position to a second, typically closed, position.

Valve actuators that are hydraulically, pneumatically or electrically operated are well known and frequently used in the oil and gas industry. These valve actuators are required to be able to open the valve and hold the valve open against the full working pressure of the valve. This internal valve pressure may exert a substantial force against the actuator, trying to overcome the opening force generated by the actuator. Simultaneously, the actuator must be able to react in an emergency situation and close the valve in a matter of seconds.

This closing operation is typically accomplished by using a large diameter coil spring acting in combination with the residual pressure in the valve acting on the stem to provide the motive force to urge the valve to its closed or failsafe position in a few seconds. This spring must be sized to have sufficient force to close the valve at the valve's rated working pressure. In the case where it is necessary to close the valve while the pressure in the valve is a relatively small percentage of the valve's rated pressure, the spring is now somewhat oversized causing the valve to "slam" shut under a great accelerative force thereby causing increased wear on the valve actuator's components. It is thus desirable to be able to control the rate at which the valve is closed and thereby minimize actuator component wear.

Previous attempts to control this closing force have focused on controlling the rate at which the actuator is closed. Various devices such as viscous rotary dampers, centrifugal clutches and centrifugal pumps with metering valves have been used. These devices suffer from various deficiencies including high breakout torque, large torque variance with temperature changes and leakage of the fluid used as the damping media. It is therefore desirable to have a clutching mechanism or similar apparatus that has a low breakout torque, is minimally affected by temperature changes and requires no fluids for operation.

2. Description of Related Art

U.S. Pat. No. 5,261,446 to Gerald S. Baker shows a self-contained emergency shutdown valve and actuator assembly with a hydraulic pilot pressure control system for determining when an emergency shutdown of the valve is required. Movement of the valve stem is done by use of a recirculating ball and nut shaft arrangement.

U.S. Pat. No. 6,152,167 to Gerald S. Baker discloses a valve actuator with an emergency shutdown feature that includes a wrap spring clutch to control movement of the actuator in one direction but not in the other unless acted upon by the tripping system.

U.S. patent application Ser. No. 09/915,796 by Johnny Newport and Todd Mosley, filed Jul. 26, 2001 and assigned to the same. assignee as the present application, shows a roller screw actuator for use with subsea chokes that uses a planetary roller screw to operate a choke.

SUMMARY OF THE INVENTION

The present invention comprises a valve actuator having a cylindrical housing with a bonnet secured to one end of the actuator housing. The bonnet has a stem bore therethrough and a stem positioned therein that is configured for attachment to a gate in a gate valve such that movement of the stem moves the gate of the gate valve between open and closed positions corresponding to operating and failsafe positions of the gate valve. A biasing module, positioned in the actuator housing, is connected to the stem and having a coil spring to urge the stem and valve gate to a closed, i.e., failsafe position. A transmission module including a low friction planetary roller screw is adjacent the biasing module and moves the stem and valve between the open and closed positions. Movement of the transmission module is opposed by the spring and the valve bore pressure. A power module drives the transmission module. An eddy current clutch is connected to the transmission module to control the movement of the stem at a preselected, linear rate as the stem is moved by the spring to the failsafe position. A pair of wrap spring clutches are used to restrain and control movement of the planetary roller screw. A control module is provided to allow selective release of the wrap spring clutch and thereby allow the spring to move the stem and valve gate to their failsafe position.

A principal object of the present invention is to provide an electrically operated valve and actuator assembly with a clutch apparatus having a substantially linear torque versus speed relationship.

Another object of the present invention is to provide an electrically operated valve and actuator assembly with a clutch apparatus with a low breakout torque.

A further object of the present invention is to provide an electrically operated valve and actuator assembly with a clutch apparatus that is minimally affected by temperature changes.

A final object of the present invention is to provide an electrically operated valve and actuator assembly with a clutch apparatus that requires no fluids for operation.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENTS

With reference to the drawings, and particularly to FIGS. 1A–1D, valve actuator assembly 10 embodying the principles of the present invention is shown. Valve actuator assembly 10 includes actuator housing 12 attached to valve bonnet 14 by threaded engagement 16. Valve bonnet 14 is sealingly secured to gate valve 18 (shown in partial section) by suitable securing means as studs 20 and nuts 22. Gate valve 18 is of a conventional configuration well known to those of ordinary skill in the art with valve closure member in the form of valve gate 24 movable therein between open and closed positions by valve actuator assembly 10 to control fluid flow through bore 26 (not shown). Valve gate 24 is typically a reverse acting gate, i.e., when the actuator moves the gate, typically upward, away from the valve bore to the closed position, the bore in the gate moves out of alignment with the inlet and outlet passages and flow is stopped. This position is referred to as the failsafe position while when the bore in valve gate 24 is aligned with the bore 26 of the valve this position is the open or operating position. Such a valve is referred to as a reverse acting gate valve or fail closed gate valve. A valve designed to fail open is accomplished with a gate having the bore moved inwardly or more closely to the end of the gate, referred to as a direct acting gate valve. Either configuration may be used with the actuator of the present invention without departing from the scope of the invention.

Valve actuator assembly 10 also includes biasing module 28, transmission module 30, power module 32 and control module 34. Valve bonnet 14 has stem bore 36 extending therethrough with stem 38 centrally located therein. The inner end of stem 38, i.e., the end located closest to gate valve 18, has enlarged diameter section 40 formed thereon which engages shoulder 42 of bonnet 14 when stem 38 is stroked to the position shown. The contact between enlarged diameter section 40 and shoulder 42 determines the up stroke of stem 38. Lip seal 44 is disposed in stem bore 36 and seals on the exterior of stem 38.

Figure 4:
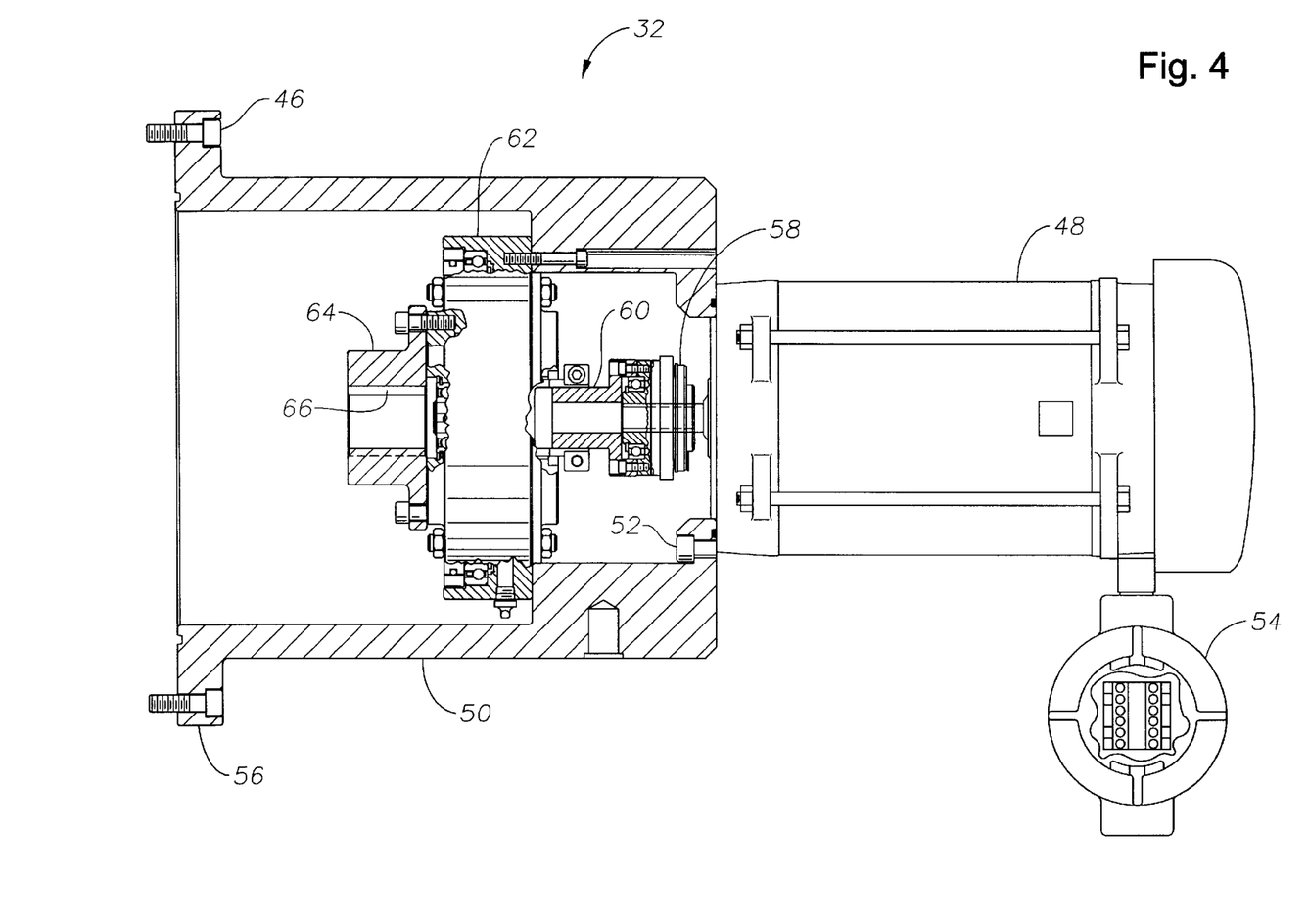
FIG. 4 is an elevation view, partly in section, showing details of the power module.

The opposite end of actuator housing 12 has power module 32 attached thereto with cap screws 46. Referring to FIG. 4, power module 32 is shown in greater detail and includes electric motor 48 secured to motor mount housing 50 by cap screws 52. The use of an electric motor as the motive force for driving the actuator in power module 32 is considered illustrative only and not limiting. It is envisioned that power module 32 could utilize other motive forces such as hydraulic or pneumatic without departing from the scope of the present invention and such modifications are considered within the scope of the present invention. Junction box 54 is mounted on the side of electric motor 48 and electrical cable (not shown) is attached for supplying electrical power. Motor mount housing 50 is a cylindrical cup shaped member with annular flange 56 formed on its end. Electric motor 48 has ratchet clutch 58 and clutch coupling 60 positioned on its output shaft to connect motor 48 to speed reducer gearbox 62. Speed reducer gearbox 62 is used to control the speed of electric motor 48 as it powers transmission module 30, in manner to be described hereinafter. Torque coupling 64 is mounted on the output side of speed reducer gearbox 62 and has coupling 66 formed on its inside to mate with transmission module 30.

Figure 1A:
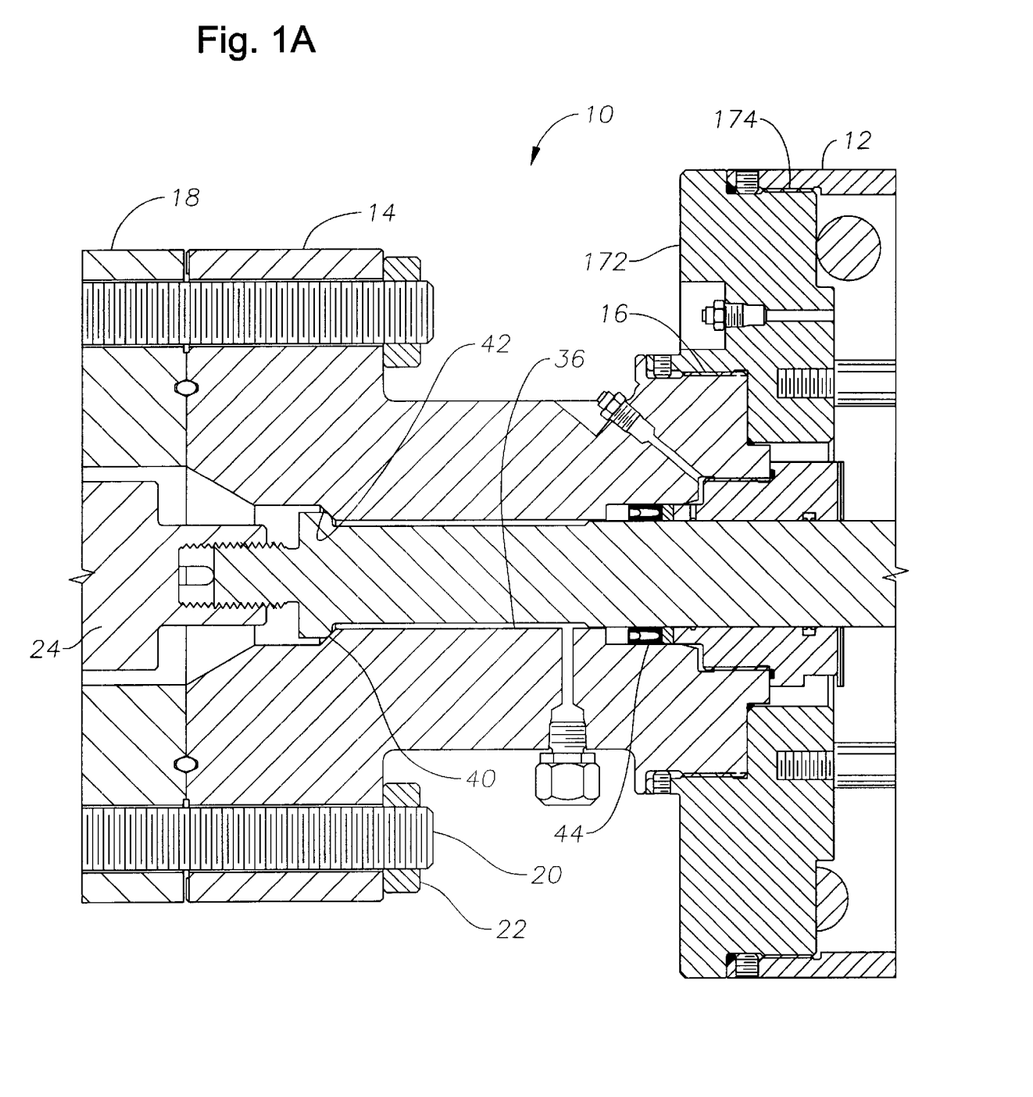
FIGS. 1A–1D are a sectional view of embodiment of the valve and valve actuator assembly of the present invention.
Figure 1B:
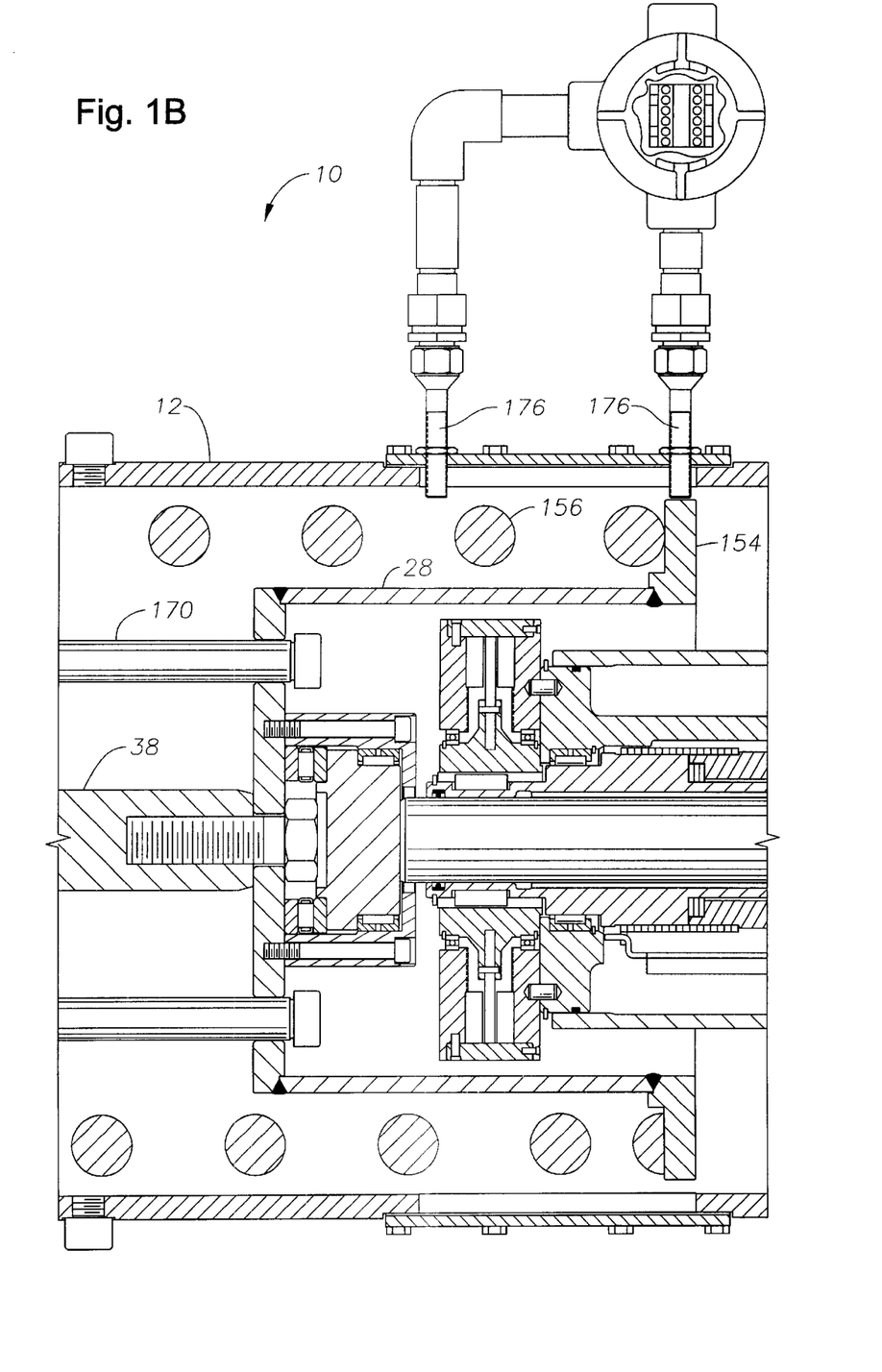
Figure 1C:
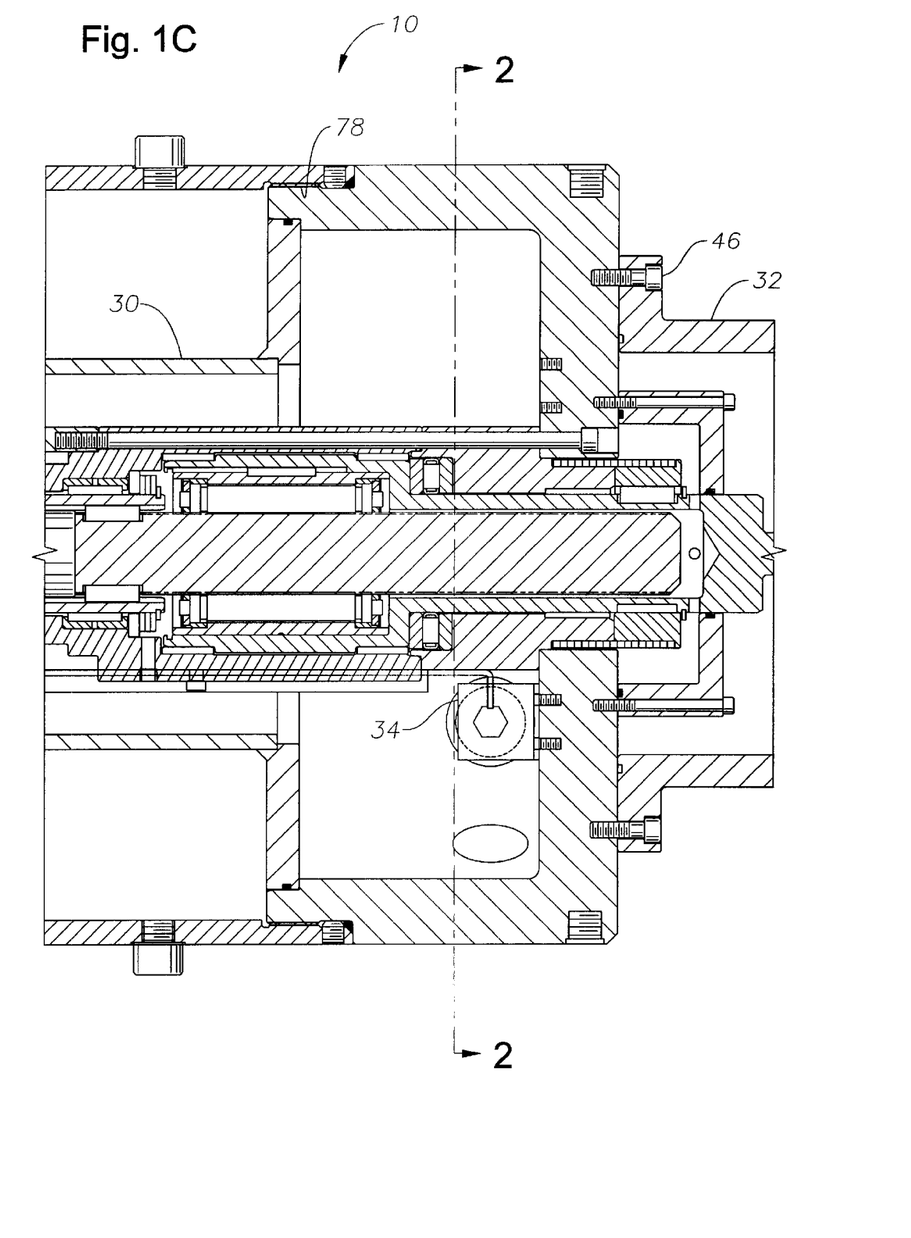
Figure 1D:
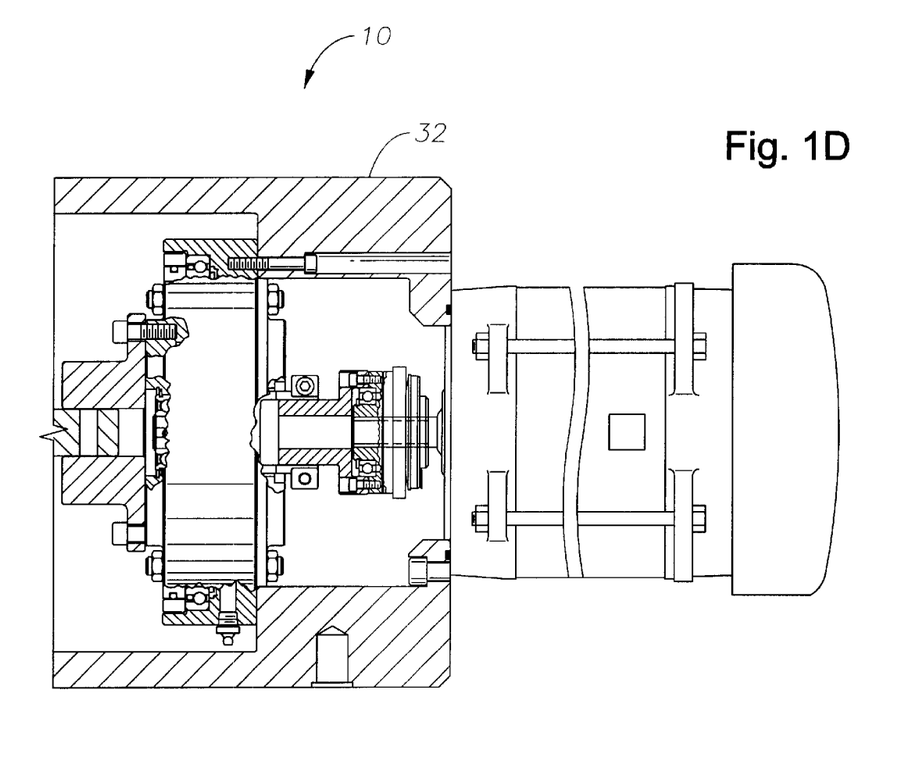
Figure 5A:
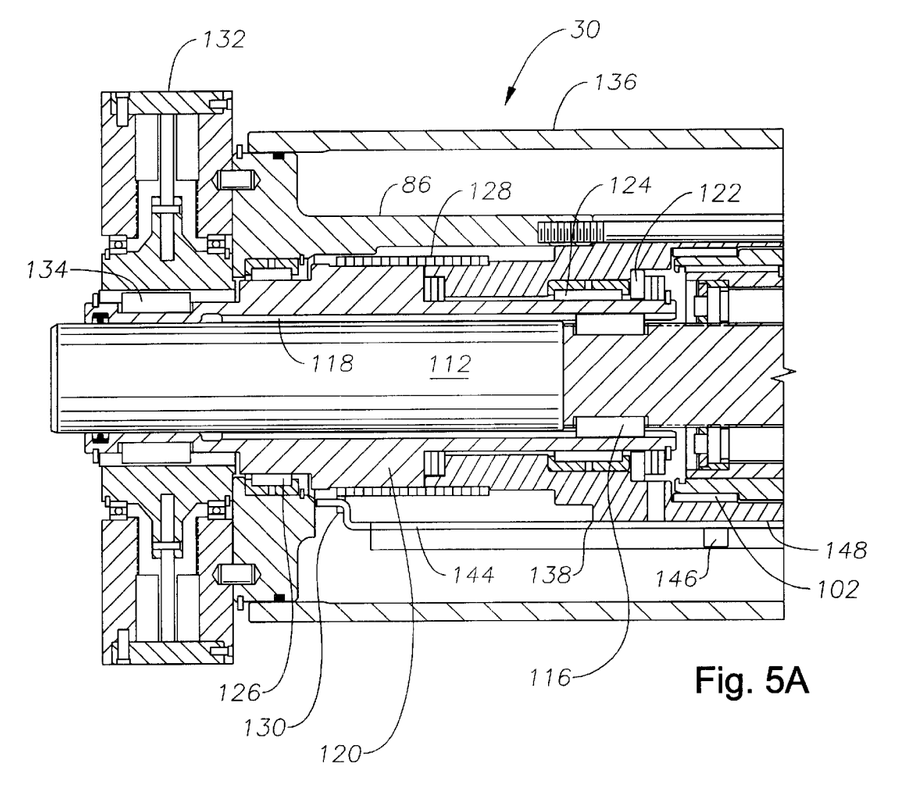
FIGS. 5A and 5B are a section view of the transmission module.
Figure 5B:
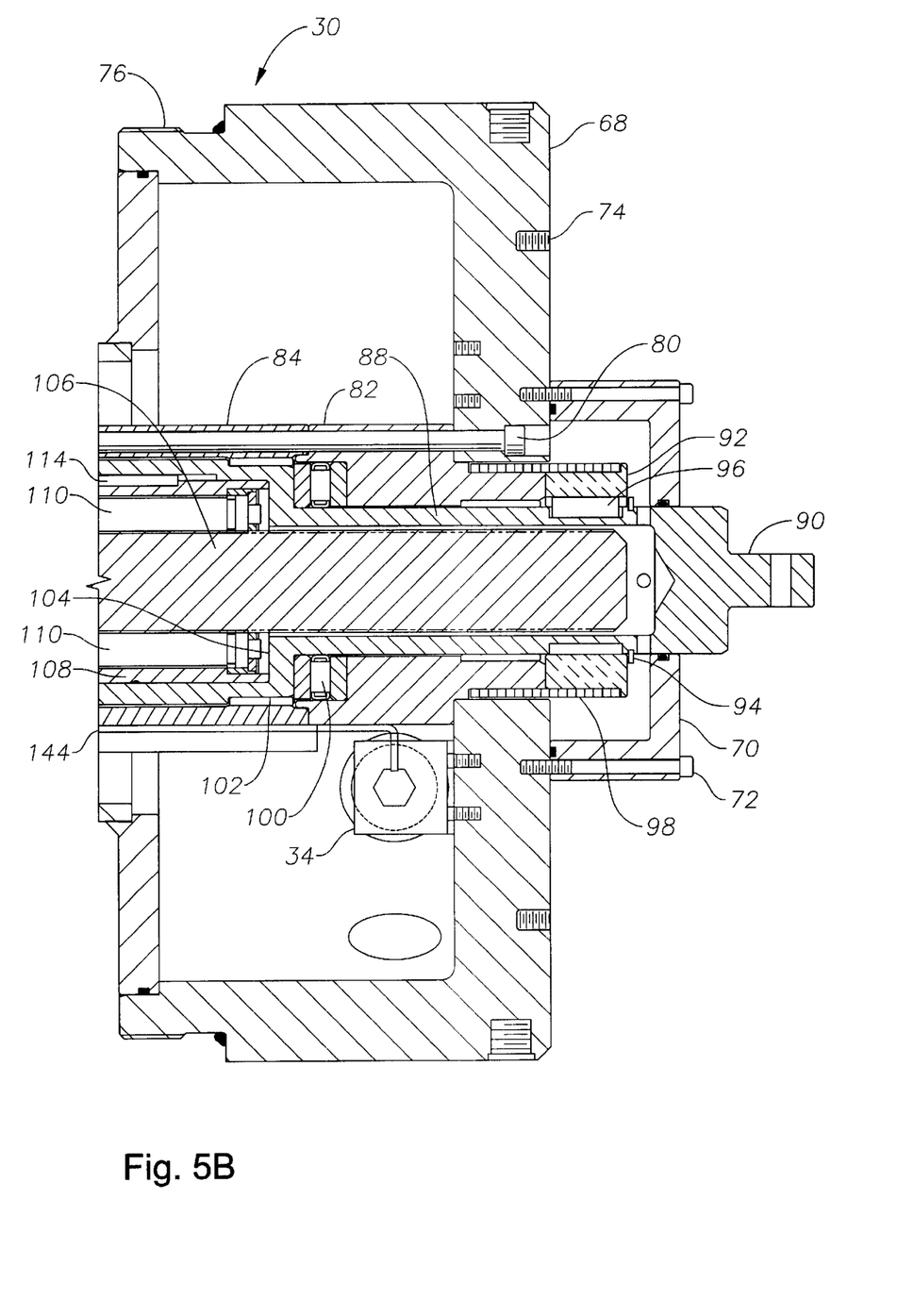

Cap screws 46 attach power module 32 to actuator housing 12 as best seen in FIG. 1C where power module 32 is coupled to transmission module 30. FIGS. 5A and 5B provide an enlarged view of the details of transmission module 30. Transmission module 30 includes upper end cap 68 to which wrap spring cap 70 is secured by cap screws 72. Threaded holes 74 are formed in the end of upper end cap 68 to receive cap screws 46 and secure power module 32 to transmission module 30. Upper end cap 68 is a generally cup shaped member with threads 76 formed on the opposite end for engagement with threads 78 on actuator housing 12 to secure transmission module within actuator housing 12. Mounted to upper end cap 68 by cap screws 80 are upper stator 82, lower stator 84 and damper mount 86 and therefore cannot rotate with respect to actuator housing 12.

Extending through wrap spring cap 70 is spindle 88 with flat end 90 formed on its end for engagement with coupling 66 of power module 32. Thus the rotation of electric motor 48 is transmitted through speed reducer gearbox 62 to rotate spindle 88 of transmission module 30. Positioned on spindle 88 adjacent flat end 90 is clutch rotor 92 held on spindle 88 by snap ring 94. Clutch rotor 92 has drive keys 96 on its interior that engage spindle 88 so that rotation of spindle 88 causes rotation of clutch rotor 92. Positioned on clutch rotor 92 and upper stator 82 is wrap spring clutch 98. Wrap spring clutch 98 is of the type disclosed in U.S. Pat. No. 5,261,446 and is sized to fit tightly on clutch rotor 92 and upper stator 82. Wrap spring clutch 98 is wound to allow power module 32 to rotate spindle 88 and move valve gate 24 toward valve 18 and into its operating position. For reasons to be explained hereinafter, wrap spring clutch 98 resists movement of spindle 88 in a direction opposite to that just described to prevent "overhauling", i.e., spindle 88 from turning the opposite direction after motor 48 is turned off. Wrap spring clutch 98 resists this movement by being wrap onto upper stator 82 which is prevented from rotating by being connected to actuator housing 12 through upper end cap 68.

Spindle 88 is supported by axially and radially by thrust bearings 100 and roller bearings 102 within upper stator 82 and lower stator 84. Counter bore 104 is formed on the inner end of spindle 88 and has low friction transmission means in the form of planetary roller screw 106 positioned therein. Planetary roller screw 106 is of the type commercially available from various vendors such as INA Bearing and also used in U.S. patent application Ser. No. 09/915,796 by Johnny Newport and Todd Mosley, filed Jul. 26, 2001 and assigned to the same assignee as the present application and incorporated herein by reference. Planetary roller screw 106 includes roller cage 108, drive rollers 110 and roller shaft 112. Drive key 114 fits in counter bore 104 and transmits rotation of spindle 88 to roller cage 108, drive rollers 110 and roller shaft 112. Roller shaft 112 does not rotate however as it is prevented from rotating by keys 116 positioned in slot 118 of lower rotor 120. Lower rotor 120 is a generally cylindrical member with a stepped shoulder on its exterior. Lower rotor is supported by axially and laterally by thrust bearings 122 and roller bearings 124 and 126 within lower stator 84 and damper mount 86.

Positioned on lower rotor 120 and lower stator 84 is wrap spring clutch 128. Wrap spring clutch 128 is the same as that of spring clutch 98 except it is wound so that as spindle 88 drives planetary roller screw 106 to move valve gate 24 toward valve 18, wrap spring clutch 128 prevents lower rotor 120 from rotating with respect to lower stator 84 and thereby causes roller shaft 112 to translate, i.e., move linearly toward valve 18, as keys 116 prevent rotation of roller shaft 112 with respect to lower rotor 120. This linear motion causes roller shaft 112 to push on biasing module 28 and urge valve gate 24 to its operating position. When it is desired to quickly close valve 18, a releasing means is provided that moves tang 130 on wrap spring clutch 128 to release the clutch in a manner that will be described hereinafter.

Damper mount 86 has clutch assembly in the form of eddy current clutch 132 mounted on its end. Eddy current clutch 132 is of the type commercially available from Magnetic Technologies Ltd., Oxford, Mass. Such clutches have a linear relationship between torque and speed. The interior of eddy current clutch 132 has key 134 disposed therein which connects to lower rotor 120 to control its speed of rotation as will be described hereinafter. Dust shield 136 connects between upper end cap 68 and damper mount 86.

Figure 2:
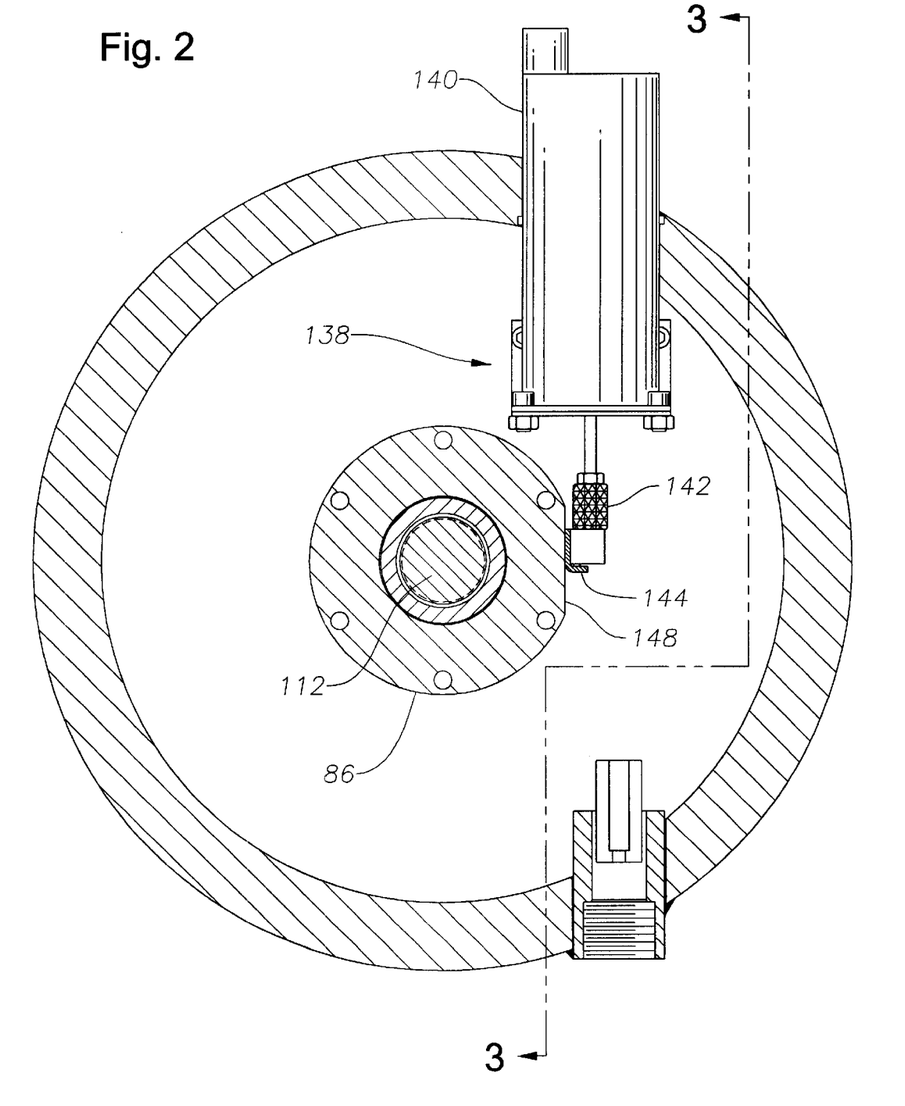
FIG. 2 is a partial sectional view, taken along lines 2—2 of FIG. 1, showing part of the control module.
Figure 3:
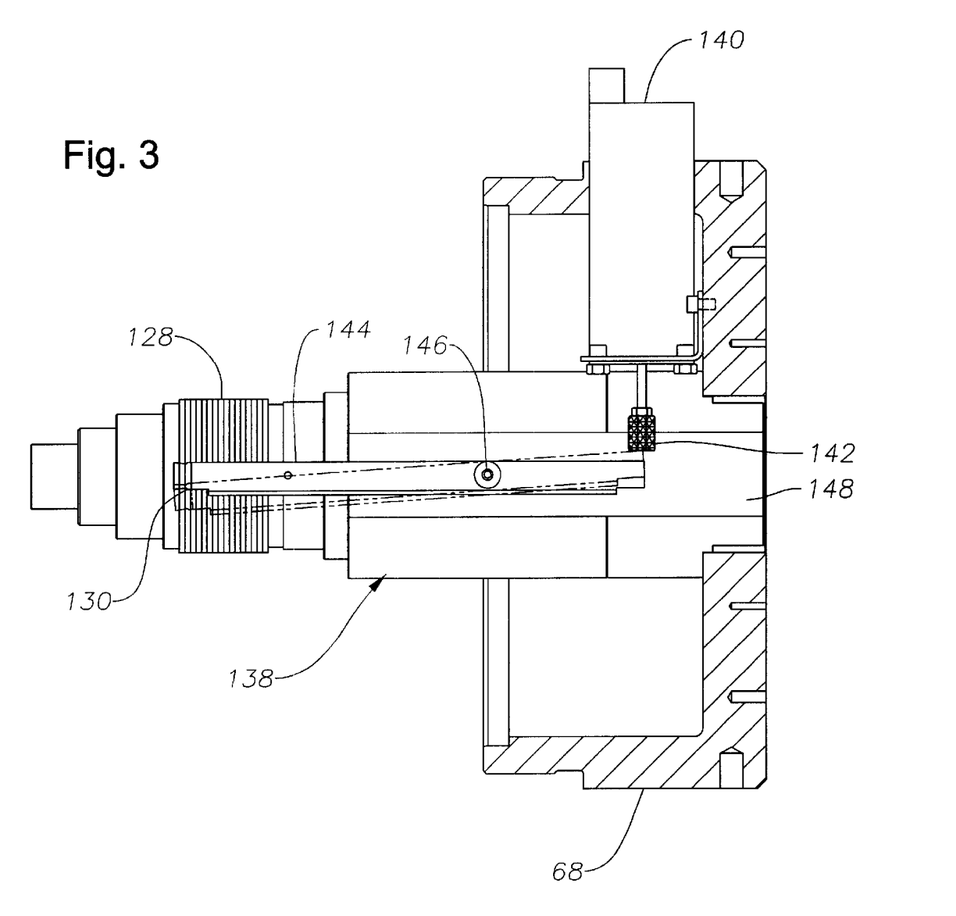
FIG. 3 is an elevation view, taken along lines 3—3 of FIG. 2, showing the details of the releasing means.

Control module 34 is shown in FIG. 5 and in greater detail in FIGS. 2 and 3. Control module 34 includes a releasing means 138 comprising solenoid 140, plunger 142 and link arm 144. When solenoid 140 is operated, plunger 142 bears on the end of link arm 144 which causes link arm 144 to pivot on screw 146 that attaches link arm 144 to lower stator 84. Surface 148 is milled on the side of lower stator 84 to allow clearance for the movement of link arm 144.

Figure 6:
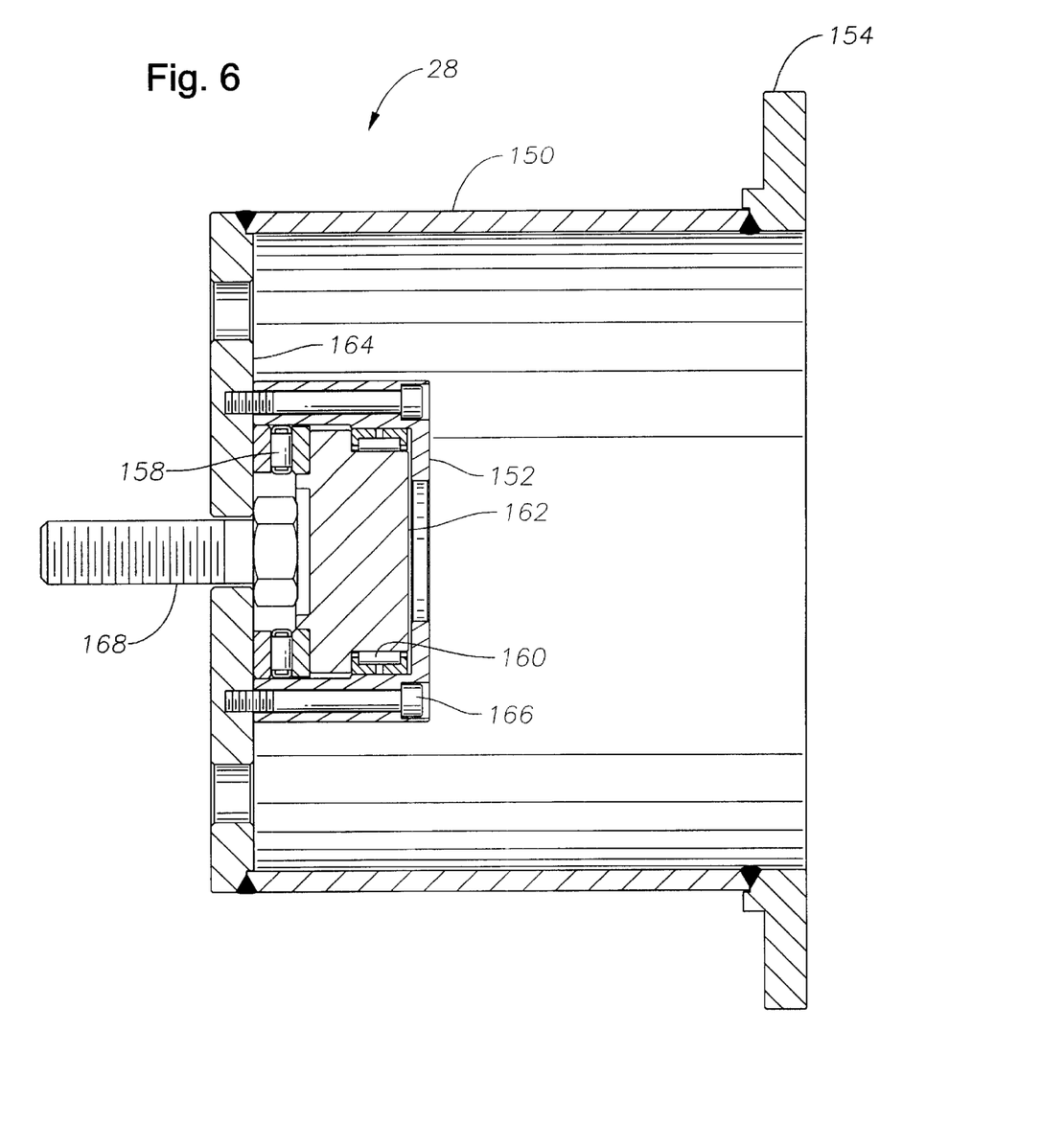
FIG. 6 is an elevation view, showing details of the biasing module.

Biasing module 28 is shown in greater detail in FIG. 6 and includes spring retainer cap 150 with bearing plate 152 secured thereto. Spring retainer cap 150 includes annular flange 154 formed on one end that contacts biasing member in the form of spring 156 as best seen in FIG. 1. Bearing plate 152 includes thrust and roller bearings 158 and 160 that support roller plate 162. Bearing plate 152 is attached to end plate 164 by cap screws 166. Hex head cap screw 168 secures biasing module 28 to stem 38 while retainer screws 170 secure biasing module 28 to housing end plate 172. Housing end plate 172 is secured to actuator housing 12 by threaded engagement 174. Referring to FIG. 1, a second part of control module 34 is shown in the form of limit switches 176 that detect the position of annular flange 154 of spring retainer cap 150 as the actuator move valve gate 24 between its operating and failsafe positions.

A typical sequence of operations would be as follows. Valve gate 24 would be in the position shown in FIG. 1, i.e., its failsafe position with the bore of valve 18 closed. Wrap spring clutch 128 is in its locked position, i.e., lower rotor 120 cannot rotate with respect to lower stator 84. Electrical power is supplied to motor 48 which then drives spindle 88 through speed reducer gearbox 62 and torque coupling 64. Spindle 88 rotates and turns roller cage 108 through drive key 114. Wrap spring clutch 98 is oriented to allow rotation in this direction. Rotation of roller cage 108 is transmitted to roller shaft 112 through drive rollers 110. Roller shaft 112 cannot rotate as keys 116 in slot 118 of lower rotor 120 prevent rotation because wrap spring clutch 128 prevents rotation of lower rotor 120 with respect to lower stator 84 and damper mount 86. This cause roller shaft 112 to move linearly toward valve 18 and bear on roller plate 162 of biasing module 28. Continued movement of roller shaft 112 urges stem 38 and valve gate 24 into valve 18 thereby opening valve 18 to its operating position. Simultaneously, spring 156 is being compressed and opposing the aforementioned linear movement of stem 38. At this point, limit switches 176 can detect the position of biasing module 28 and ascertain if valve 18 is open. Power to electric motor 48 can then be turned off. Pressure within valve 18 that acts across the diameter defined by seal 46 on stem 38 will attempt to attempt to backdrive or "overhaul" electric motor 48. This is prevented by wrap spring clutch 98 that prevents opposite rotation of roller shaft 112 as previously described.

When it is desired to shut the valve, i.e., move it from its operating to failsafe position, releasing means 138 is activated by removing electrical power from solenoid 140 and extending plunger 142 and moving link arm 144 which in turn moves tang 130 to release wrap spring clutch 128. This allows spring 156 and the pressure end load acting on stem 38 to urge stem 38 outwardly, i.e., away from valve 18. This causes a rapid movement of stem 38 and roller plate 162 that is bearing on roller shaft 112. As roller shaft 112 moves upwardly and rotates on drive rollers 110, roller cage 108 attempts to rotate also. However, key 114 between roller cage 108 and spindle 88 prevents rotation of roller cage 108 as spindle 88 is locked against rotation by wrap clutch 98 which prevents backdriving of spindle 88 as previously described. Thus roller shaft 112 rotates upwardly into spindle 88 to return to the position of FIG. 1. This rotation of roller shaft 112 is transmitted to lower rotor 120 and through key 134 to eddy current clutch 132. As the outer portion of eddy current clutch 132 is restrained from movement by being pinned to damper mount 86, the rate of rotation of roller shaft 112 is controlled by eddy current clutch 132. The drag thus produced controls the rate at which spring 156 can urge stem 38 and valve gate 24 outwardly to the failsafe position. This drag of the eddy current clutch allows the valve to thereby be closed at a reduced rate without "slamming" the valve shut.

The construction of my electric valve actuator with eddy current clutch will be readily understood from the foregoing description and it will be seen that I have provided an electrically operated valve and actuator assembly with a clutch apparatus having a substantially linear torque versus speed relationship. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A valve actuator, comprising:
   an actuator housing;
   a bonnet secured to said actuator housing having a stem bore therethrough;
   a stem positioned within said stem bore of said bonnet, said stem configured for attachment to a valve closure member within a gate valve wherein movement of said stem moves said valve closure member within said gate valve between open and closed positions corresponding to operating and failsafe positions of said gate valve;
   a biasing module positioned within said actuator housing, connected to said stem and having a biasing member for urging said stem to a failsafe position;
   a transmission module moving said stem between said failsafe and operating positions, said movement opposed by said biasing member;
   a power module driving said transmission module;
   a control module to selectively release said stem from its operating position and allow said biasing member to move said stem to its failsafe position; and,
   a clutch assembly connected to said transmission module to control the movement of said stem at a preselected, linear rate as said stem is moved by said biasing member to said failsafe position.

2. A valve actuator according to claim 1, wherein:
   said clutch assembly is an eddy current clutch.

3. A valve actuator according to claim 2, wherein said transmission module includes:

a low friction transmission means;

first and second wrap spring clutches;

said first wrap spring clutch positioned on the end of said low friction transmission means adjacent said power module and preventing pressure within said gate valve from moving said valve closure member from its operating to failsafe position; and, said second wrap spring clutch positioned on the end of said low friction transmission means adjacent said biasing module and preventing said biasing member from moving said valve closure member from its operating to failsafe position until said second wrap spring clutch is selectively released by a releasing means.

4. A valve actuator according to claim 3, wherein:

said low friction transmission means is a planetary roller screw.

5. A valve actuator according to claim 4, wherein said releasing means includes:

a link arm; and, a solenoid actuating a plunger, said plunger contacting said link arm when said solenoid is actuated to move a release tang positioned on said second wrap spring clutch and release said second wrap spring clutch and thereby allow said biasing member to move said stem to its failsafe position.

6. A valve actuator according to claim 5, wherein:

said power module includes a gear reducer to limit rotational speed of said planetary roller screw.

7. A valve actuator according to claim 6, wherein:

said biasing module includes a bearing plate, said bearing plate contacting said planetary roller screw and allowing linear movement of said stem to cause simultaneous linear movement and rotation of said planetary roller screw.

8. A valve actuator according to claim 7, wherein said control module includes:

a plurality of position sensors-to detect the position of said biasing member when said stem is in its operating and failsafe positions.

9. A valve actuator according to claim 8, wherein:

said biasing member is a spring.

10. A valve actuator according to claim 1, wherein said transmission module includes:

a low friction transmission means;

first and second wrap spring clutches;

said first wrap spring clutch positioned on the end of said low friction transmission means adjacent said power module and preventing pressure within said gate valve from moving said valve closure member from its operating to failsafe position; and, said second wrap spring clutch positioned on the end of said low friction transmission means adjacent said biasing module and preventing said biasing member from moving said valve closure member from its operating to failsafe position until said second wrap spring clutch is selectively released by a releasing means.

11. A valve actuator according to claim 10, wherein:

said low friction transmission means is a planetary roller screw.

12. A valve actuator according to claim 10, wherein said releasing means includes:

a link arm; and, a solenoid actuating a plunger, said plunger contacting said link arm when said solenoid is actuated to move a release tang positioned on said second wrap spring clutch and release said second wrap spring clutch and thereby allow said biasing member to move said stem to its failsafe position.

13. A valve actuator according to claim 1, wherein:

said power module includes a gear reducer to limit rotational speed of said planetary roller screw.

14. A valve actuator according to claim 1, wherein:

said biasing module includes a bearing plate, said bearing plate contacting said planetary roller screw and allowing linear movement of said stem to cause simultaneous linear movement and rotation of said planetary roller screw.

15. A valve actuator according to claim 1, wherein said control module includes:

a plurality of position sensors to detect the position of said biasing member when said stem is in its operating and failsafe positions.

16. A valve actuator according to claim 1, wherein:

said biasing member is a spring.

17. A valve and valve actuator assembly, comprising:

a valve body having a bore therethrough;

a valve closure member movably positioned within said valve body to control flow through said valve body bore;

a bonnet sealingly secured to said valve body having a stem bore therethrough;

a stem positioned within said stem bore of said bonnet, said stem configured for attachment to said valve closure member wherein movement of said stem moves said valve closure member between open and closed positions corresponding to operating and failsafe positions of said gate valve;

an actuator housing sealingly secured to said bonnet;

a biasing module positioned within said actuator housing, connected to said stem and having a biasing member for urging said stem to a failsafe position;

a transmission module moving said stem between said failsafe and operating positions, said movement opposed by said biasing member;

a power module driving said transmission module;

a clutch assembly connected to said transmission module to control the movement of said stem at a preselected, linear rate as said stem is moved by said biasing member to said failsafe position;

a control module to selectively release said stem from its operating position and allow said biasing member to move said stem to its failsafe position; and, a clutch assembly connected to said transmission module to control the movement of said stem at a preselected, linear rate as said stem is moved by said biasing member to said failsafe position.

18. A valve and valve actuator assembly according to claim 17, wherein:

said clutch assembly is an eddy current clutch.

19. A valve and valve actuator assembly according to claim 18, wherein said transmission module includes:

a low friction transmission means;

first and second wrap spring clutches;

said first wrap spring clutch positioned on the end of said low friction transmission means adjacent said power module and preventing pressure within said gate valve from moving said valve closure member from its operating to failsafe position; and, said second wrap spring clutch positioned on the end of said low friction transmission means adjacent said biasing module and preventing said biasing member from moving said valve closure member from its operating to failsafe position until said second wrap spring clutch is selectively released by a releasing means.

20. A valve and valve actuator assembly according to claim 19, wherein:

said low friction transmission means is a planetary roller screw.

21. A valve and valve actuator assembly according to claim 20, wherein said releasing means includes:

a link arm; and, a solenoid actuating a plunger, said plunger contacting said link arm when said solenoid is actuated to move a release tang positioned on said second wrap spring clutch and release said second wrap spring clutch and thereby allow said biasing member to move said stem to its failsafe position.

22. A valve and valve actuator assembly according to claim 21, wherein:

said power module includes a gear reducer to limit rotational speed of said planetary roller screw.

23. A valve and valve actuator assembly according to claim 22, wherein:

said biasing module includes a bearing plate, said bearing plate contacting said planetary roller screw and allowing linear movement of said stem to cause simultaneous linear movement and rotation of said planetary roller screw.

24. A valve and valve actuator assembly according to claim 23, wherein said control module includes:

a plurality of position sensors to detect the position of said biasing member when said stem is in its operating and failsafe positions.

25. A valve and valve actuator assembly according to claim 24, wherein:

said biasing member is a spring.

26. A valve and valve actuator assembly according to claim 17, wherein said transmission module includes:

a low friction transmission means;

first and second wrap spring clutches;

said first wrap spring clutch positioned on the end of said low friction transmission means adjacent said power module and preventing pressure within said gate valve from moving said valve closure member from its operating to failsafe position; and, said second wrap spring clutch positioned on the end of said low friction transmission means adjacent said biasing module and preventing said biasing member from moving said valve closure member from its operating to failsafe position until said second wrap spring clutch is selectively released by a releasing means.

27. A valve and valve actuator assembly according to claim 26, wherein:

said low friction transmission means is a planetary roller screw.

28. A valve and valve actuator assembly according to claim 26, wherein said releasing means includes:

a link arm; and, a solenoid actuating a plunger, said plunger contacting said link arm when said solenoid is actuated to move a release tang positioned on said second wrap spring clutch and release said second wrap spring clutch and thereby allow said biasing member to move said stem to its failsafe position.

29. A valve and valve actuator assembly according to claim 17, wherein:

said power module includes a gear reducer to limit rotational speed of said planetary roller screw.

30. A valve and valve actuator assembly according to claim 17, wherein:

said biasing module includes a bearing plate, said bearing plate contacting said planetary roller screw and allowing linear movement of said stem to cause simultaneous linear movement and rotation of said planetary roller screw.

31. A valve and valve actuator assembly according to claim 17, wherein said control module includes:

a plurality of position sensors to detect the position of said biasing member when said stem is in its operating and failsafe positions.

32. A valve and valve actuator assembly according to claim 17, wherein:

said biasing member is a spring.

* * * * *